US008831355B2

(12) United States Patent
Bober et al.

(10) Patent No.: US 8,831,355 B2
(45) Date of Patent: Sep. 9, 2014

(54) SCALE ROBUST FEATURE-BASED IDENTIFIERS FOR IMAGE IDENTIFICATION

(75) Inventors: Miroslaw Bober, Guildford (GB); Paul Brasnett, Surbiton (GB)

(73) Assignee: Mitsubishi Electric Corporation, Tokyo (JP)

( * ) Notice: Subject to any disclaimer, the term of this patent is extended or adjusted under 35 U.S.C. 154(b) by 989 days.

(21) Appl. No.: 12/989,362

(22) PCT Filed: Apr. 21, 2009

(86) PCT No.: PCT/GB2009/001016
§ 371 (c)(1),
(2), (4) Date: Nov. 5, 2010

(87) PCT Pub. No.: WO2009/130451
PCT Pub. Date: Oct. 29, 2009

(65) Prior Publication Data
US 2011/0038545 A1 Feb. 17, 2011

(30) Foreign Application Priority Data

Apr. 23, 2008 (GB) .................................. 0807411.4

(51) Int. Cl.
*G06K 9/46* (2006.01)
(52) U.S. Cl.
CPC .................................. *G06K 9/4633* (2013.01)
USPC .......................................................... 382/192
(58) Field of Classification Search
CPC ........... G06T 2207/10024; G06T 2207/20021;
G06K 9/6211; G06K 9/4633; G06K 9/4638;
G06K 9/00456; G06K 9/00; G06K 9/183;
G06K 9/4671; G06K 9/6219

USPC .......................................... 382/190, 192, 231
See application file for complete search history.

(56) References Cited

U.S. PATENT DOCUMENTS 5,825,925 A * 10/1998 Baird et al. .................... 382/225
5,903,682 A *  5/1999 Chun ............................. 382/276
(Continued)

FOREIGN PATENT DOCUMENTS

CN          101056417 A    10/2007
EP            1594078 A2    11/2005
(Continued)

OTHER PUBLICATIONS

Nakagawa et al., "Location Identification from Omnidirectional Images," IPSJ SIG Technical Report, vol. 2007, No. 42, CVIM-159, May 15, 2007, pp. 65-72.

(Continued)

*Primary Examiner* — Edward Park
(74) *Attorney, Agent, or Firm* — Birch, Stewart, Kolasch & Birch, LLP

(57) ABSTRACT

A method for deriving an image identifier comprises deriving a scale-space representation of an image, and processing the scale-space representation to detect a plurality of feature points having values that are maxima or minima. A representation is derived for a scale-dependent image region associated with one or more of the detected plurality of feature points. In an embodiment, the size of the image region is dependent on the scale associated with the corresponding feature point. An image identifier is derived using the representations derived for the scale-dependent image regions. The image identifiers may be used in a method for comparing images.

31 Claims, 3 Drawing Sheets

(56) References Cited

U.S. PATENT DOCUMENTS

| | | | |
|---|---|---|---|
| 6,192,153 B1 * | 2/2001 | Suzuki et al. | 382/199 |
| 6,711,293 B1 * | 3/2004 | Lowe | 382/219 |
| 6,975,755 B1 * | 12/2005 | Baumberg | 382/154 |
| 7,382,897 B2 * | 6/2008 | Brown et al. | 382/103 |
| 8,064,679 B2 * | 11/2011 | Griffin | 382/133 |
| 8,442,285 B2 * | 5/2013 | Madabhushi et al. | 382/128 |
| 2002/0199164 A1 * | 12/2002 | Sengupta et al. | 716/11 |
| 2003/0171668 A1 | 9/2003 | Tsujino et al. | |
| 2004/0170302 A1 * | 9/2004 | Museth et al. | 382/107 |
| 2006/0013473 A1 * | 1/2006 | Woodfill et al. | 382/154 |
| 2006/0210170 A1 | 9/2006 | Yumoto et al. | |
| 2007/0110333 A1 * | 5/2007 | Kondo et al. | 382/276 |
| 2007/0236713 A1 | 10/2007 | Ishiguchi | |
| 2007/0258648 A1 * | 11/2007 | Perronnin | 382/224 |
| 2007/0269107 A1 | 11/2007 | Iwai et al. | |

FOREIGN PATENT DOCUMENTS

| | | |
|---|---|---|
| EP | 1 912 160 A1 | 4/2008 |
| JP | 2001-67462 A | 3/2001 |
| JP | 2003-250804 A | 9/2003 |
| JP | 2005-208979 A | 8/2005 |
| JP | 2005-317020 A | 11/2005 |
| JP | 2008-77626 A | 4/2008 |
| WO | WO 01/04842 A1 | 1/2001 |
| WO | WO 2008/084185 A1 | 7/2008 |
| WO | WO 2009/001025 A1 | 12/2008 |
| WO | WO 2009/047471 A1 | 4/2009 |
| WO | WO 2009/087340 A1 | 7/2009 |

OTHER PUBLICATIONS

C. Schmid, "A Structured Probabilistic Model for Recognition", Proc. Computer Vision and Pattern Recognition, 2, 485-490, Jun. 1999.

Copeland A.C. et al: "Localized Random Transform-Based Detection of Ship Wakes in SAR Images" IEEE Transactions on Geoscience and Remote Sensing, IEEE Service Center, Piscataway, NJ, US, Jan. 1995, pp. 35-45.

D.G. Lowe, "Distinctive Image Features from Scale Invariant Keypoints", International Journal of Computer Vision, 60, 2, 2004. pp. 91-110.

Isabelle Couloigner et al: "Interative and Localized Radon Transform for Road Centerline Detection from Classified Imagery" Image Analysis and Recognition: [Lecture Notes in Computer Science], Springer Berlin Heidelberg, Berlin, Heidelberg, vol. 4633. Aug. 22, 2007, pp. 1093-1104, XP019097910 ISBN: 978-3-540-74258-6 the whole document.

Lindeberg T: "Feature Detection with Automatic Scale Selection" Int. J. of Computer Vision, vol. 30, No. 2, 1998, pp. 79-116, XP-002533094.

Lindeberg, T: "Scale-space theory: A basic tool for analysing structures at different scales" J. of Applied Statistics, vol. 21, No. 2, 1994, pp. 225-270, XP-002533095.

Open CV Reference Manual, Chapter 1: Image Processing Gradients, Edge and Corners—"FindCornerSubPix": http://opencvlibrary.sourceforge.net/CvReference, Oct. 2008.

\* cited by examiner (a)

(b)

(c)

(d)

(e)

(f)

(g)

SCALE ROBUST FEATURE-BASED IDENTIFIERS FOR IMAGE IDENTIFICATION

BACKGROUND TO THE INVENTION

This invention relates to the problem of robust image identification and discloses a new method that offers advantages over prior art methods such as those disclosed in the earlier filed, co-pending patent applications EP 06255239.3, GB 0700468.2, GB 0712388.8, GB 0719833.6 and GB 0800364.2.

DESCRIPTION OF THE RELATED ART

The aim of robust identification of multimedia content is to extract information that is preserved under typical modifications that may be performed on it. That modification may be for innocent or malicious purposes. In the case of images, a robust identifier should be substantially preserved when subjected to compression, greyscale transformation, rotation, noise, colour alteration, cropping and translation amongst others. Additionally, an identifier should provide discrimination powers such that independent content has sufficiently different identifiers.

The techniques disclosed in European patent application No. EP 06255239.3, and UK patent application Nos. GB 0700468.2, GB 0712388.8 and GB 0719833.6 are similar in that they all extract an identifier based on global information, that is information about the whole image. This family of related identifiers provide robustness close to 100% at very low false alarm rates (which means they provide high discrimination ability), with typical rates being less than 0.1 parts per million.

Large numbers of images exist in various image databases, embedded in web-pages, presentation and documents. A survey of prominent web sites shows that Flickr has over 2 billion images, Photobucket has over 4 Billion and Facebook has 1.7 Billion. Consumers often have thousands of photographs in their personal collections and professionals will have significantly more. To be of practical use given the large size of datasets, identifiers must also allow for very fast searching. The techniques disclosed in patent applications EP 06255239.3, GB 0700468.2, GB 0712388.8 and GB 0719833.6 may allow for search speeds of over 10 million images per second.

Despite high levels of robustness to many common image modifications the prior art identifiers disclosed in patent applications EP 06255239.3, GB 0700468.2, GB 0712388.8 and GB 0719833.6 may not provide the required level of robustness to a class of image modifications, where a significant part of image content is lost or replaced, such as translation and cropping. The technique disclosed in GB 0800364.2 provides significantly improved robustness under this class of image modifications. It is a process that involves i) feature detection and selection, ii) feature region and identifier extraction and iii) matching. The present invention proposes an improvement on the robustness of the prior art image identifiers.

Prior art feature point methods have been developed in the areas of computer vision and object recognition [references 2, 3 infra]. The approaches rely on a very large number of points:

> "An important aspect of this approach is that it generates large numbers of features that densely cover the image . . . . A typical image of size 500×500 pixels will give rise to about 2000 features." [reference 2 infra]

The result of extracting large numbers of features is that searching and matching calculations become very slow; in the naïve case all features from a query image should be compared with all features from all images in the database. In order to reduce the search times prior art methods use various forms of data-structures, however these structures come at the cost of additional database initialisation times, additional storage and memory requirements and often some approximations are made which trades improved search speed for lower detection rates.

The present invention is concerned with detecting images and their modified versions, which differs from the area of application of much of the prior art. In particular, image duplicate detection is concerned with finding modified versions of an image e.g. cropped, compressed etc. In contrast, most prior art methods are concerned with detecting specific objects or a class of objects in images, e.g. a Ford Focus car or cars. Whilst the distinction between these problems may appear trivial or subtle it is important. Consider, for example, two images of St Paul's Cathedral in London, the images are taken from two different view points. Now under the object recognition task the similarity between these images should be detected but under the image duplicate detection the similarity should not be detected. With this in mind different techniques are needed to deal with the two different problems.

The method disclosed in GB 0800364.2 develops a binary feature point descriptor based on the Trace transform. The advantage of using a binary descriptor is that the Hamming distance is used for feature matching, which makes the searching process very fast. Furthermore, a selection process limits the number of features to a small set that proves to be surprisingly robust to difficult image modifications such as cropping and translation. Whilst the robustness is good it is desirable to provide further improvements.

SUMMARY OF THE INVENTION

In accordance with to a first aspect, the present invention provides a method for deriving a representation of an image, i.e. an image descriptor, by processing signals corresponding to the image. The method comprises deriving a scale-space representation of the image. The scale-space representation is processed to detect a plurality of feature points in the scale-space representation having amplitude extrema (i.e. maxima or minima values). For one or more of the detected plurality of feature points, the method determines a scale-dependent image region associated with the corresponding feature point. A representation for each determined, scale-dependent image region is then derived.

Thus, an image descriptor may be derived, based on the features of the image having the highest feature strength.

In an embodiment, the plurality of feature points are detected by applying a first operator based on second order image gradients, to the scale-space representation of the image, and identifying those feature points in the scale-space representation with the highest resulting values. A second operator may then be applied to the detected plurality of feature points, the second operator based on first order image gradients, and features points with resulting values below a threshold removed. A predetermined number of features points may be selected from the plurality of features points detected by applying the first and second operators.

In other embodiments, the plurality of feature points may be detected using the operators in a different order, or using different techniques, according to the desired application.

Preferably, for selected one or more detected features points, a scale-dependent image region is determined by determining a spatial region of the image associated with the spatial position of the feature point, wherein the size of the spatial region is based on the scale of the feature point.

A representation for each determined, scale-dependent image region, may be derived based on line projections across the image region, such as by using the Trace transform, or equivalent.

In one example, for each of the one or more determined scale-dependent image regions, a function of at least part of the image region is derived, where the function of a translated, scaled or rotated version of an image region is a translated or scaled version of the function of the image region. The step of deriving a function of at least part of the image region may comprise applying a first functional along lines over the image region. The method may further comprise applying a second functional to the derived function to obtain an intermediate representation of the at least part of the image region.

A representation for each determined, scale-dependent image region may comprise a binary image descriptor.

A representation of the image may be derived from two or more of the derived representations of the scale-dependent image regions.

In accordance with a second aspect, the present invention provides a method for comparing images using descriptors of images derived using a method according to the first aspect of the present invention. The method comprises comparing representations of one or more scale-dependent image regions associated with the descriptor of a first image, with representations of one or more scale-dependent image regions associated with the descriptor of a second image.

Further aspects of the present invention include: use, including transmission or reception, of a representation of an image derived using a method according to the first aspect of the present invention; an apparatus for executing a method according to the first aspect or the second aspect of the present invention, or both, and a computer-readable storage medium comprising instructions that, when executed by a computed, perform a method according to the first aspect or the second aspect of the present invention, or both.

Other features and advantages of the invention will be apparent from the following description and accompanying claims.

This invention includes two main aspects that improve the robustness as required, i) region-scale is incorporated into the process of feature selection and extraction and ii) a matching process of up to four stages is developed that maintains robustness whilst minimising computational cost.

A feature detection process is used to select a plurality of features, having a spatial and scale location. The feature selection uses a novel process to choose features appropriate to the task and that have been shown experimentally to work well with Trace transform based feature descriptors.

For image matching a trade off is needed between detection performance, independence, computational time and memory requirements. In the disclosed embodiment, a four step matching process is introduced which aims to maximise detection rates and independence, whilst minimising both computational time and memory requirements. The first stage quickly determines hypotheses (i.e. candidates) with high probability and eliminates low probability matches, the second stage tests these hypotheses and removes a significant number of false hypothesis. The third stage eliminates further false hypotheses. Each stage involves an increased level of complexity over the previous stages, so complexity is managed and minimised by eliminating false hypotheses as early as possible in the process.

As well as the aforementioned aspects, other aspects of the invention include deriving a representation of an image based on the selected and extracted features of the image, and an apparatus and a computer program for implementing processes according to one or more aspects of the present invention.

BRIEF DESCRIPTION OF THE DRAWINGS

Embodiments of the invention will now be described with reference to the accompanying drawings, of which:

FIG. 1a shows an image;
FIG. 1b shows a reduced version of the image of FIG. 1a;
FIG. 1c shows a rotated version of the image of FIG. 1a;
FIG. 1d shows a blurred version of the image of FIG. 1a;
FIG. 1e shows a flipped (left-right) version of the image of FIG. 1a;
FIG. 1f shows a heavily compressed version of the image of FIG. 1a;
FIG. 1g shows a cropped version of the image of FIG. 1a.

DETAILED DESCRIPTION OF THE EMBODIMENTS

Various embodiments for deriving a representation of an image, specifically an image identifier, and for using such a representation/identifier for the purposes of, for example, identification, matching or validation of an image or images, will be described below. The present invention is especially useful for, but is not restricted to, identifying an image. In the described embodiments, an "image identifier" (also referred to as "identifier", "descriptor", "image descriptor", "signature" or "image signature") is an example of a representation of an image and the term is used merely to denote a representation of an image, or descriptor.

The skilled person will appreciate that the specific design details of an image identification apparatus and method, according to an embodiment of the invention, and the derivation of an image identifier for use in image identification, is determined by the requirements related to the type of image modifications it should be robust to, the size of the identifier, extraction and matching complexity, target false-alarm rate, etc.

The following example illustrates a generic design that results in an identifier that is robust to the following modifications to an image (this is not an exhaustive list):

Colour reduction,
Blurring,
Brightness Change,
Flip (left-right & top-bottom),
Greyscale Conversion,
Histogram Equalisation,
JPEG Compression,
Noise, Rotation,
Cropping,
Scaling,
Translation,
Skewing and
Perspective change.

It has been found that the proposed design may typically achieve a low false-alarm rate of less than 1 parts per million (ppm) on a broad class of images and typical detection rates above 98.0%.

Figure 1:
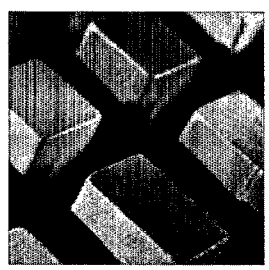
Figure 1:
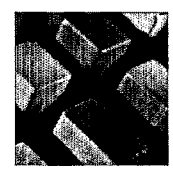
Figure 1:
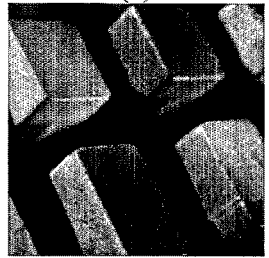
Figure 1:
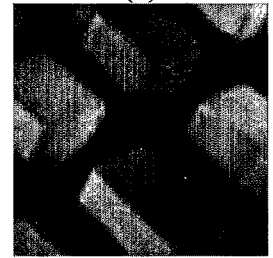
Figure 1:
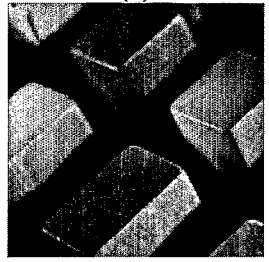
Figure 1:
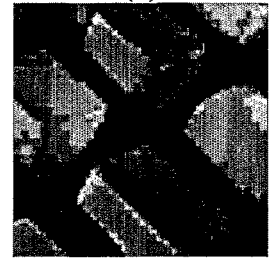
Figure 1:
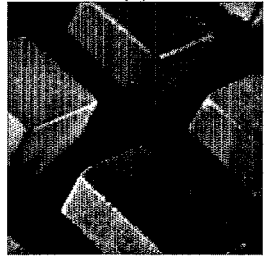

FIG. 1 shows an example of an image and modified versions of the image. More specifically, FIG. 1a is an original image, FIG. 1b is a reduced (scaled) version of the image of FIG. 1a, FIG. 1c is a rotated version of the image of FIG. 1a, FIG. 1d is a blurred version of the image of FIG. 1a, FIG. 1e is a flipped version of the image of FIG. 1a, FIG. 1f is a compressed version of the image of FIG. 1a and FIG. 1g is a cropped version of the image of FIG. 1a.

An embodiment of the invention derives a representation of an image, and more specifically, an image identifier, by processing signals and/or image data corresponding to the image.

Feature Point Detection and Selection

Consistent with EP 06255239.3, GB 0700468.2, GB 0712388.8, GB 0719833.6 and GB 0800364.2, in the initial stage of extraction of the image identifier the image is optionally pre-processed by resizing and filtering. The resizing step is used to normalise the images before processing. The filtering step can comprise of filtering to remove effects such as aliasing it can also include region selection and tapering. In one embodiment the image is resized to a resolution of 256×N or N×256, where N≥256 and preserving the aspect ratio. In another embodiment the image is resized to a square of 256×256. The image is then low pass filtered with a 3×3 Gaussian kernel. The pre-processing steps are optional and can include any combination of the above.

In the next stage feature points are detected in the image. One embodiment uses a feature detector to detect potential features in an image and their strength based on measuring image gradients. One suitable image feature detector based on first order image gradients is the Harris as used in GB 0800364.2

$$(I_x^2(x,y)I_y^2(x,y)-I_xI_y(x,y)I_xI_y(x,y))-\alpha(I_x^2(x,y)+I_y^2(x,y))^2, \quad (1)$$

where $I_x(x, y)$ is the first order derivative of the image intensity $I(x, y)$ at location $(x, y)$ and $\alpha$ is a parameter that controls feature detection.

An alternative second order detector is the Laplacian (which corresponds to the trace of the second order partial derivative Hessian matrix)

$$|I_{xx}(x,y)+I_{yy}(x,y)|, \quad (2)$$

where $I_{xx}(x, y)$ is the second order derivative of the image at location $(x\ y)$.

In GB 0800364.2 the features are selected at just one scale, that is the normalised version of the original image. Furthermore the area around the feature, which forms an image region from which a feature signature is extracted, is fixed. However, under the cropping modification, part of the image is lost. When the image is geometrically normalised (as in the aforementioned pre-processing or by a user) a region becomes larger relative to the same region in the original image. Under heavy cropping the Trace transform based descriptors of these two regions becomes unacceptably different; the distance may be above the threshold for declaring similarity.

In order to address this problem, in accordance with a first aspect of the present invention, "scale estimation" may be used. Scale estimation attempts to select an appropriate scale for analysis of each feature. It should be noted that each feature will be associated with its own scale.

First, a scale-space representation of an image is derived. In embodiments, a scale-space representation of an image may be constructed in one of two ways (although other techniques are possible and contemplated). The first is to successively smooth and sample the original image, the second is to repeatedly smooth the image with increasing filter size. Features are then detected by finding maxima in the location-scale space. It has been shown that an optimal choice for the smoothing filter is a Gaussian (filter), an image smoothed by a Gaussian (filter) is denoted $$J(x,y,\sigma_D)=G(\sigma_D)*I(x,y), \quad (3)$$

where * is the convolution operator and $G(\sigma_D)$ is a Gaussian filter and $\sigma_D$ is the standard deviation of the smoothing filter that determines the scales.

In one embodiment, two detectors are used to provide good detection of the location and scale of features in the scale-space representation, one detector uses first order gradients, the other uses second order gradients.

Firstly, the modified scale corrected Laplacian of Gaussian operator $$\sigma_D^{\gamma 2}|G(\sigma_I)*J_{xx}(x,y,\sigma_D)+G(\sigma_I)*J_{yy}(x,y,\sigma_D)|, \quad (4)$$

is used to detect a plurality of feature locations and scales (i.e. feature points in the scale-space representation). Where $G(\sigma_I)$ is the Gaussian filter used for integration that averages the derivatives, $\sigma_I$ is the integration scale and $\gamma$ is a scale normalisation parameter. The introduction of integration smoothing to the scale adapted Laplacian helps to improve the performance of the feature detector.

The second detector is the scale-adapted Harris operator $$(R_x^2(x,y,\sigma_D,\sigma_I)R_y^2(x,y,\sigma_D,\sigma_I)-R_xR_y(x,y,\sigma_D,\sigma_I)\\R_xR_y(x,y,\sigma_D,\sigma_I))-\alpha(R_x^2(x,y,\sigma_D,\sigma_I)+\\R_y^2(x,y,\sigma_D,\sigma_I))^2, \quad (5)$$

where $$R_x(x,y,\sigma_D,\sigma_I)=G(\sigma_I)*J_x(x,y,\sigma_D). \quad (6)$$

Accordingly, the Laplacian equation (4) applied in scale space, and the locations and scales with the highest value are then chosen as potential features. Then those features with a non-significant (i.e. below a threshold) Harris detector response are removed from the set of potential features. A selection procedure as described below is applied to select a representative set of features from the set of potential features resulting from the use of the two detectors. In an embodiment, up to a predetermined number of features are chosen.

The strongest feature, according to the Laplacian detector equation (4), from the allowable features amongst the detected features is selected first. A feature is rejected if it is closer to the edge of the image than the radius r computed from the feature scale, see equation (7). The subsequent features are selected by order of strength with the restriction that a feature is not selected if it is within an exclusion zone around any of the previously selected features. In one embodiment, a circular region with a radius of 10 pixels is used as the exclusion zone. The selection process terminates once a predetermined number of representative features (e.g. 32 features) has been selected or no more features remain.

Figure 2:
FIG. 2 shows an image and a bit string representation of the image according to the prior art.
Figure 2:
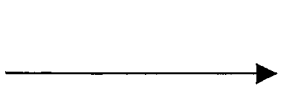
Figure 3:
FIG. 3 shows an example set of interest points of an image detected by a feature detector.
Figure 4:
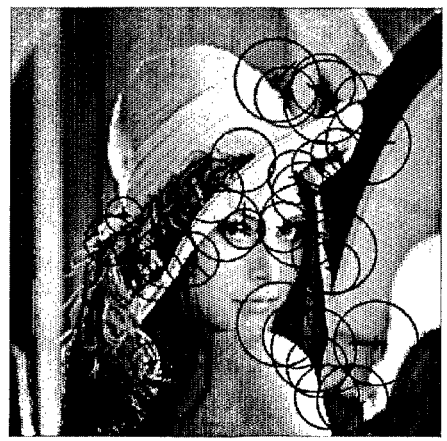
FIG. 4 shows an image from which a final set of features is chosen, the scale of the feature is indicated by the size of the circle and the direction of the feature is indicated by the line.

A set of features of the image of FIG. 2, selected from those detected, as shown in FIG. 3, is shown in FIG. 4, the scale is represented by the size of the circle and the feature direction is represented by the line. It will be appreciated that the detected features and their surrounding image regions are representative of, or significant to, the image as a whole.

Now that the location of the feature (or interest) points has been selected, their position is preferably refined at the selected scale to sub-pixel resolution using for example a method such as described in OpenCV (FindCornerSubPix) Mar. 1, 2008, which can be obtained on the Internet at http://opencvlibrary.sourceforge.net/CvReference, reference [1] infra).

Feature Region & Identifier Extraction

In GB 0719833.6, incorporated herein by reference, a method for extracting a binary image identifier or image representation is disclosed. In an embodiment of the present invention, the method of GB 0719833.6 is applied to extract a binary "feature identifier" from regions around feature points. Thus, each feature identifier is a binary representation of an image region associated with a detected feature. The image region may have a predetermined size. For example, in one embodiment a circular image region, having a radius of 32 pixels, centred on a feature point, is selected and the binary signature is computed for the image region. The circular region is preferably extracted to sub-pixel level accuracy, using cubic interpolation, for example.

Preferably, instead of using a fixed feature region radius, the scale at which the feature is detected is used to adapt the region size appropriately. The radius of the region to be selected at scales is given by:

$$r = r_0 \sigma_D, \sigma_D = \kappa \sigma_0^s \quad (7)$$

where $r_0$ is the base radius, $\sigma_0$ is the initial scale and $\kappa$ is a constant that is a design parameter. It is also worth noting that a good choice for the integration scale is $$\sigma_I = \sigma_0^s.$$

In a preferred embodiment $\kappa=0.6$, $\sigma_0=1.14$, $r_0=20$ s $\in(0, 1, \ldots, S)$ and $S=14$. The region determined by the feature location (x, y) and radius r is extracted to sub-pixel accuracy, using cubic interpolation. The region is then normalised to a predefined size, given by the normalised radius $\hat{r}$ which is 32 in the preferred embodiment. The extracted region is then processed to derive a corresponding image identifier, using the method according to GB 0719833.6. A brief summary of this method is provided below.

A Trace transform $T(d, \theta)$ of the image region is performed by projecting all possible lines, parameterised by d, $\theta$ over the image and applying a first functional T over these lines. The result of the Trace transform may be decomposed to reduce its resolution in either or both of its dimensions d, $\theta$ in accordance with the method disclosed in GB 0700468.2. A second functional P may be applied to the columns of the Trace transform to give a vector of real numbers (i.e. a one dimensional function), as in the methods of EP 06255239.3 and GB 0700468.2. This second functional P is known as the diametrical functional and the resulting vector is known as the circus function.

A third functional, the circus functional, may be applied to the circus function to give a single number, although this step is not used in the preferred embodiment.

Alternatively, in accordance with the method of GB 0719833.6, a so-called "band-circus" function may be obtained, as an alternative to the circus function discussed above, which restricts the Trace transform to a subset of lines of the image, by selecting and processing values from only a part of the Trace transform.

The properties of the result can be controlled by appropriate choices of the first, second and/or third functional (Trace, diametrical and circus).

A binary identifier for the image region is extracted from the circus function (or the band-circus function) via a frequency representation. For example, a function $c(\omega)$ may be defined on the magnitude coefficients of the Fourier transform. One illustration of this function is taking the difference of neighbouring coefficients $$c(\omega) = |F(\omega)| - |F(\omega+1)| \quad (8)$$

A binary string can be extracted by applying a threshold to the resulting vector, such that $$b_\omega = \begin{cases} 0, & c(\omega) < S \\ 1, & c(\omega) \geq S \end{cases} \text{ for all } \omega. \quad (9)$$

Suitable choices for S include S=0 and S=mean(c). The binary representation of the image region is then made up of these binary string values $B=\{b_0, \ldots, b_n\}$.

In an embodiment of the present invention, since local image regions are used (as opposed to entire images as in GB 0719833.6) modifications need to be made to the signature extraction technique described therein. In particular, two identifiers are extracted from the circus functions of the full Trace transform using the functionals:

$$\max(\xi(t)), \quad (10)$$

and $$\int |\xi(t)'| dt. \quad (11)$$

in accordance with the method disclosed in EP 06255239.3.

A further six, "multi resolution" identifiers may be extracted from circus functions obtained by decomposing (or sub-sampling) the distance (d) parameter of the Trace transform by a factor of 8, 16 and 32 and applying both equations (10) and (11), in accordance with the method disclosed in GB 0700468.2.

A further three functions are selected from bands in the Trace transform, in accordance with the method disclosed in GB 0712388.8, and two functions are extracted from the trace-annulus functions and one function is extracted from the trace-circular function, in accordance with the method disclosed in GB 0719833.6.

Each of these 14 component identifiers is 8 bits, giving a total of 112 bits for each feature identifier.

Additionally, a scale adapted feature direction is also calculated that integrates over a neighbourhood for each feature $$\theta(x, y) = \tan^{-1}\left(\frac{R_x(x, y, \sigma_D, \sigma_I)}{R_y(x, y, \sigma_D, \sigma_I)}\right). \quad (12)$$

The direction $\theta$ is quantised to preferably 16 levels, which can be represented by 4 bits of data.

Figure 7:
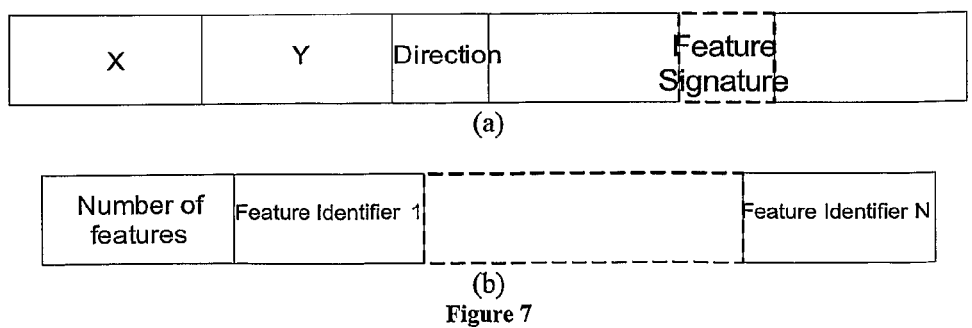
FIG. 7 is a diagram showing the structure of a feature identifier (a) and an image identifier (b) according to and embodiment of the present invention.

The image identifier or descriptor is formed from all or some of the feature signatures. An image identifier for the complete set of feature points may be represented in a number of ways. In a preferred embodiment the image descriptor is a bit stream containing a number of fields of information, the first field is the number of features. Then each feature is represented in the bitstream as the normalised feature point coordinates (x and y), the quantised feature direction, followed by the binary feature signature. Optionally, rather than store the number of features, padding could be used with a flag set to represent an unused field. The binary feature signature includes all 112 bits or optionally a subset of the 112 bits may be selected, derived or stored. The structure of feature identifiers is shown in FIG. 7(a) and the image signature in FIG. 7(b).

Image Matching using Feature Identifiers

Image matching may be performed by comparing or matching feature signatures, which form part of the image identifiers. As mentioned previously, for efficiency the full matching procedure between a pair of images, by comparing feature signatures, is made up of four stages. Hypotheses are formed in stages one and three. A series of geometric tests are performed in stages two and four, these tests must be passed in order for a hypothesis to progress to the next stage. The stages become increasingly computationally complex so each stage aims to minimise the number of hypotheses that are accepted for subsequent processing.

A first step involves forming hypotheses for potential matching features by comparing the first M out of N feature signatures from one image with the first M out of N feature signatures from the second image. The advantage of using a subset of M is that it speeds up whilst maintaining robustness. In a preferred embodiment N is 32 and M is 24.

To perform matching between two signatures $B_1$ and $B_2$, the Hamming distance is taken:

$$H(B_1, B_2) = \Sigma B_1 \otimes B_2, \qquad (13)$$

where $\otimes$ is the exclusive OR (XOR) operator.

In a preferred embodiment, a set of hypotheses (candidate pairs of potentially matching features) is generated with all combinations of three pairs of matching features. A hypothesis is made up a set of three pairs of feature points ($a_1$, $a_2$, $a_3$, $b_1$, $b_2$, $b_3$). A set of three pairs of features is declared a match if the distance of each feature pair is below a constant threshold $T_A$ and the cumulative distance is below some second constant threshold $T_B$. In a preferred hypothesis $T_A$=0.06 and $T_B$=0.2. The set of hypotheses is ordered by their cumulative distance, with the lowest distance (i.e. highest probability of being a match) first. In order to minimise complexity the number of hypotheses may be limited to the K hypotheses corresponding to the lowest distance. In a preferred embodiment K is 18.

A second step applies geometric constraints to each generated from stage one. Two geometric constraints are applied to reduce false matches, i) feature direction and ii) the ratio of line lengths.

As described above, a direction is associated with each feature, the direction for feature $a_n$ is denoted $\theta_{an}$. The difference between angles corresponding to features from the same image is taken to ensure that the angle distance measure is unaffected by a rotation. The distance measure must address the issue of left-right and top-bottom flip modification as is done here using these two measures of angle distance $$\Omega_1 = |(\theta_{a1} - \theta_{a2}) - (\theta_{b1} - \theta_{b2})| \text{ and } \Lambda_1 = |(\theta_{a1} - \theta_{a2}) + (\theta_{b1} - \theta_{b2})| \qquad (14)$$

Thresholds are applied to the two angle distance measures $\Omega_1$, $\Lambda_1$ to test whether they are in allowable intervals. Allowable values for the angle distances are dependant on the number of levels in the angle quantisation Q and are given by $$\Omega_1 \leq q \text{ OR } Q-q \leq \Omega_1 \leq Q+q \text{ OR } \Lambda_1 \leq q \text{ OR } Q-q \leq \Lambda_1 \leq Q+q. \qquad (15)$$

where q is a constant that can be used to vary the sensitivity to changes of angle. In a preferred embodiment q is set to 1 and Q is 16.

Figure 5:
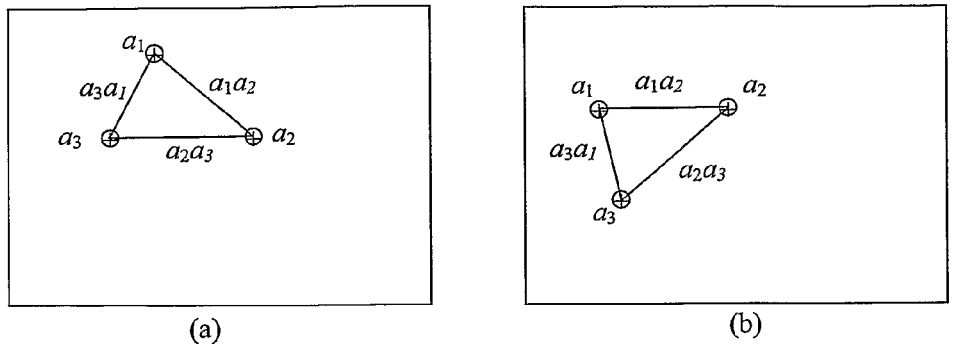
FIG. 5 shows interest points found to match using the Hamming distance from (a) an original image and (b) a rotated version of (a), in which the line lengths between the interest points are used to apply geometric constraints.

Using the locations of features selected in each hypothesis a ratio of line lengths between the features is used as a constraint, as shown in FIG. 5. By $|a_1 a_2|$ we denote the length of the line connecting the location of feature $a_1$ to the location of feature $a_2$. Three feature points $|a_1 a_2|$, $|a_2 a_3|$ and $|a_3 a_1|$ are used to find the ratio of lines lengths. Three line length ratios are computed $$L_1 = \frac{|a_1 a_2|}{|a_1 a_3|}, \quad L_2 = \frac{|a_2 a_3|}{|a_3 a_1|} \text{ and } L_3 = \frac{|a_3 a_1|}{|a_1 a_2|}. \qquad (16)$$

Measures of similarity ($G_1$, $G_2$, $G_3$) between the line length ratios for two images A and B are defined as:

$$G_1 = \frac{|L_1^A - L_1^B|}{L_1^A + L_1^B}, \quad G_2 = \frac{|L_2^A - L_2^B|}{L_2^A + L_2^B} \text{ and } G_3 = \frac{|L_3^A - L_3^B|}{L_3^A + L_3^B}. \qquad (17)$$

Advantageously, the ratio of line lengths between defined points in an image are invariant to transformations such as rotation, translation and scaling, such that the above geometric constraint is suitable for matching an image that has undergone such geometric transformations. However, other suitable geometric constraints may be used, consistent with design requirements.

In an embodiment two thresholds are applied to the distance measures, one to constrain the magnitude of the individual measures and the other to constrain the sum of the distances.

Any hypothesis that fails one or more of the tests described above is removed from the set of valid hypotheses. If after testing all hypotheses the set is empty the images are declared non-matching. If the hypothesis has passed all tests then it progresses to the next stage to generate four feature hypotheses.

The third stage of matching compares all N features from the first image with all N features from the second image. Now, there is already a hypothesis for three feature pairs so the aim is to find a set of hypotheses with four pairs, hypotheses that add one more feature to the current three feature pair hypothesis. Potential features are found based on the signature distance as in stage one. The set of hypotheses are ordered by the distance of the fourth feature.

In stage four geometric analysis is carried out on the sets of four feature hypotheses to further reduce false acceptance rates. The first geometric constraint is based on the feature direction equations (14) and (15) as for three features. The ratio of lines used previously is invariant to similarity transforms. With four features the invariance can be relaxed to the more general affine transformation by using the ratio of areas as described below. This allows tighter thresholds to be set which accept true matches whilst rejecting false matches.

From a set of four features ($a_1$, $a_2$, $a_3$, $a_4$), four triangles may be constructed ($a_1 a_2 a_3$, $a_2 a_3 a_4$, $a_3 a_4 a_1$, $a_4 a_1 a_2$), the areas of these triangles can be found from $$A_1 = \sqrt{(s(s-|a_1 a_2|)(s-|a_2 a_3|)(s-|a_3 a_1|))}, \qquad (18)$$

where $s=(|a_1 a_2|+|a_2 a_3|+|a_3 a_1|)/2$. Area ratios can then be calculated as $$A_{1/2} = \frac{A_1}{A_2}, \qquad (19)$$

and the distances between an area ratio of image A and an area ratio for image B can then be found by $$D(A_{1/2}, B_{1/2}) = \frac{|A_{1/2} - B_{1/2}|}{A_{1/2} + B_{1/2}}. \qquad (20)$$

Two thresholds $T_C$ and $T_D$ are applied to the set of four area ratio distances between the feature sets. The first threshold rejects hypothesis which have any of the area ratios distance above a first threshold $T_C$. The second rejects hypothesis for which the sum of distances is larger than a threshold $T_D$. In a preferred embodiment $T_c=0.15$ and $T_D=0.4$ The image matching technique of the above described embodiments of the present invention may be combined with other image matching techniques, such as the method disclosed in GB 0719833.6. A descriptor is generated for each image that contains all of the individual identifiers. In a preferred embodiment the identifier bitstream contains two identifiers based on GB 0719833.6, and a descriptor according to the present invention. Of the two identifiers based on GB 0719833.6 the first is generated by pre-processing the image to maintain the image aspect ratio and the other where it is processed to a square.

Preferably the matching is performed first with the faster algorithm of GB 0719833.6 at a very low false alarm threshold. Any image pairs below the threshold are considered to be a match, and pairs above the threshold (that is not considered a match by GB 0719833.6) are then processed in accordance with the present invention.

Figure 6:
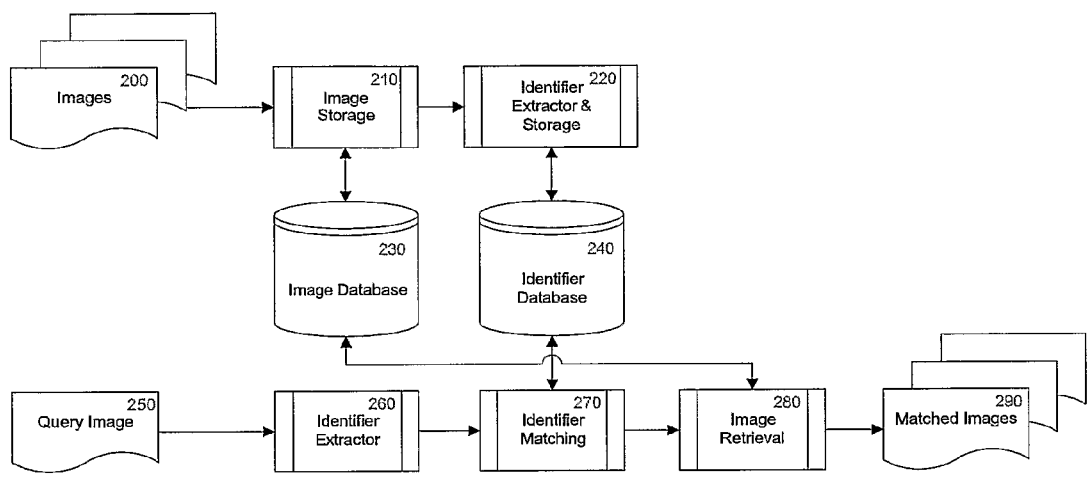
FIG. 6 is a block diagram of an apparatus according to an embodiment of the present invention.

An apparatus for implementing the present invention, according to an embodiment, for carrying the above methods is shown in FIG. 6. The implementation involves building a database of identifiers 240 for images stored in an image database 230. The two databases 230 and 240 may be the same or separated databases. The apparatus allows searching for an identifier 260 extracted from a query image 250 to find matches in the identifier database 140. A, possibly ordered, list of images is returned to the user 290 or a query application.

As the skilled person will appreciate, many variations and modification may be made to the described embodiments. For example, whilst the described embodiments identify image regions, from which the image signature is derived, based on feature detection, other techniques may be used to identify image regions that are representative of, or significant within, the image. Moreover, whilst the described embodiment uses a feature detector based on an image gradient method, many other suitable methods may be used for the detection of interest points or regions in an image. Similarly, other techniques for selecting the best or strongest detected feature or interest points are possible.

In addition, it is possible to use one or more of a variety of geometric constraints other than the distance measures relating to the ratio of lines lengths associated with a set of three feature points, used in the described embodiment. For example, any number of features points can be used in conjunction with distance measures. Alternatively, other geometric constraints may be based on angles between feature points. Moreover, an affine model may be used to define the geometric constraint.

It is intended to include all such variations, modifications and equivalents which fall within the spirit and scope of the present invention.

Alternative Implementations

Whilst the description above uses brute force searching to generate hypotheses in some situations it may be beneficial to use a structure that allows approximate Hamming distance calculations. This would provide increased search speed at the cost of some level of detection.

The feature matching approach presented is amenable to casting into a probabilistic model along the lines presented in [reference 4 infra].

REFERENCES

1. Open CV Reference Manual, Chapter 1: Image Processing Gradients, Edge and Corners—"FindCornerSubPix": http://opencvlibrary.sourceforge.net/CvReference
2. D. G. Lowe, "Distinctive Image Features from Scale Invariant Keypoints", International Journal of Computer Vision, 60, 2, 2004. pp. 91-110.
3. D. G. Lowe, "Method and apparatus for identifying scale invariant features in an image and use of same for locating an object in an image", U.S. Pat. No. 6,711,293, March 2000.
4. C. Schmid, "A Structured Probabilistic Model for Recognition", Proc. Computer Vision and Pattern Recognition, 2, 485-490, June 1999.

The invention claimed is:

1. A method for deriving a representation of an image by processing signals corresponding to the image, the method comprising: deriving a scale-space representation of the image; processing the scale-space representation to detect a plurality of feature points having amplitude extrema; for one or more of the detected plurality of feature points, determining a scale-dependent image region associated with the corresponding feature point, and deriving a representation for each determined, scale-dependent image region, the method comprising selecting a predetermined number of feature points from the detected plurality of feature points, and determining a scale-dependent image region associated with each of the selected feature points, wherein the spatial positions of the selected feature points are distributed across the image, and the spatial position of each selected feature point is separated from the other selected feature points by at least a predetermined distance in the image, by selecting feature points by order of strength with the restriction that a feature point is not selected if it is within an exclusion zone around any of the previously selected features.

2. A method as claimed in claim 1, wherein the plurality of feature points are detected by applying an operator based on second order image gradients, to the scale-space representation of the image, and identifying those feature points in the scale-space representation with the highest resulting values.

3. A method as claimed in claim 1, where the step of selecting comprises removing from the detected plurality of feature points those feature points having the lowest amplitude values in the scale-space representation, or amplitude values in the scale-space representation below a threshold.

4. A method as claimed in claim 1, wherein the step of selecting comprises removing, from the detected plurality of feature points, feature points according to their spatial position in the image.

5. A method as claimed in claim 1, wherein the step of selecting comprises applying an operator to the detected plurality of feature points, the operator based on first order image gradients, and removing the features points with resulting values below a threshold.

6. A method as claimed in claim 5, wherein the operator is a scale adapted Harris operator.

7. A method as claimed in claim 1, wherein the step of determining a scale-dependent image region for a feature point in the scale-space representation comprises determining a spatial region of the image associated with the spatial position of the feature point, wherein the size of the spatial region is based on the scale of the feature point.

8. A method as claimed in claim 1, further comprising:
before determining a scale-dependent image region, refining the spatial positions of the one or more feature points to sub-pixel resolution, preferably using cubic interpolation.

9. A method as claimed in claim 1, wherein the step of deriving a representation for each determined, scale-dependent image region, comprises deriving a representation based on line projections across the image region, preferably using the Trace transform, or equivalent.

10. A method as claimed in claim 1, wherein the step of deriving a representation for each determined, scale-dependent image region, comprises:
deriving a function of at least part of the image region; and
using the function to obtain an intermediate representation of the at least part of the image region.

11. A method as claimed in claim 10, comprising:
for each of the one or more determined scale-dependent image regions:
deriving a function of at least part of the image region, where the function of a translated, scaled or rotated version of an image region is a translated or scaled version of the function of the image region.

12. A method as claimed in claim 10, wherein:
the step of deriving a function of at least part of the image region comprises applying a first functional along lines over the image region, the method preferably further comprising;
applying a second functional to the derived function to obtain an intermediate representation of the at least part of the image region.

13. A method as claimed in claim 1, further comprising:
deriving the representation of the image from two or more of the derived representations of the scale-dependent image regions.

14. A method as claimed in claim 1, further comprising:
for the one or more of the plurality of feature points, determining a feature direction for the feature point, preferably by integrating over a neighbourhood of the feature point.

15. A method as claimed in claim 14, wherein the feature direction is determined using the equation:

$$\theta(x, y) = \tan^{-1}\left(\frac{R_x(x, y, \sigma_D, \sigma_I)}{R_y(x, y, \sigma_D, \sigma_I)}\right). \quad (12)$$

where: θ is the feature direction of the feature point at spatial position (x, y).

16. A method as claimed in claim 1, wherein the step of deriving a representation for each determined, scale-dependent image region comprises deriving a binary image descriptor for the scale-dependent image region.

17. A method for comparing images using descriptors of images derived using a method as claimed in claim 1, the method comprising:
comparing representations of one or more scale-dependent image regions associated with the descriptor of a first image, with representations of one or more scale-dependent image regions associated with the descriptor of a second image.

18. A method as claimed in claim 17, comprising:
comparing a subset of the representations of image regions of the descriptor of a first image with a corresponding subset of the representations of image regions of the descriptor of a second image, to identify candidate pairs of matching image regions.

19. A method as claimed in claim 17, comprising:
determining a first plurality of sets of a predetermined number of features points associated with image regions represented in the descriptor of the first image;
determining a second plurality of sets of the predetermined number of features points associated with image regions represented in the descriptor of the second image;
comparing a set of the determined first plurality of sets with a set of the determined second plurality of sets using a matching algorithm.

20. A method as claimed in claim 19, wherein the predetermined number is three, and the matching algorithm is based on the Hamming distance between a pair of representations of image regions associated with features points in the first and second images, and the cumulative Hamming distance between the three pairs of representations of image regions associated with features points in the first and second images.

21. A method as claimed in claim 20, further comprising:
determining candidate matching sets of features points, in the first and second images, when:
said Hamming distance is below a first threshold, and
said cumulative Hamming distance is below a second threshold.

22. A method as claimed in claim 21, further comprising:
applying a geometric constraint to geometric information for each said candidate matching set, to eliminate false matches from the candidate sets.

23. A method as claimed in claim 22, wherein the step of applying a geometric constraint comprises:
determining the length of spatial lines between each of the feature points in the candidate sets;
determining a ratio between pairs of the lines in the candidate sets of the first image and the second image, and
deriving at least one measure of similarity between the determined line length ratios associated with the first image and the determined line length ratios associated with the second image.

24. A method as claimed in claim 22, wherein the representations of the image regions associated with the feature points include feature direction information, and the geometric constraint takes into account feature direction.

25. A method as claimed in claim 22, further comprising:
eliminating a candidate matching set of feature point from the candidate sets if a measure of similarity is below a threshold.

26. A method as claimed in claim 22, further comprising:
if there are no candidate matching sets, determining that the first and second images do not match.

27. A method as claimed in claim 26, further comprising:
if candidate matching sets remain:
comparing the representations of all of the image regions of the descriptor of a first image with the representations of all of the image regions of the descriptor of a second image, to determine a further matching set of feature points, not present in the candidate set.

28. A method as claimed in claim 27, wherein a further matching set of feature points is determined based on a lowest Hamming distance between feature points of the first and second images, not present in the candidate sets.

29. A method as claimed in claim 27, further comprising:
adding the determined further matching set of feature points to the candidate sets, to produce updated candidate sets, and
applying a geometric constraint to geometric information for each updated candidate matching set of four feature points, to further eliminate false matches from the candidate sets.

30. An apparatus comprising:
an image database for storing images or representations of images:
an identifier database; and
a processor configured to execute for executing the method of claim 1 or claim 17.

31. A non-transitory computer storage medium having stored thereon instructions that, when executed by a computer, perform the method as claimed in claim 1 or claim 17.

* * * * *